US007724678B1

(12) United States Patent
Johnsen et al.

(10) Patent No.: US 7,724,678 B1
(45) Date of Patent: *May 25, 2010

(54) METHOD AND APPARATUS FOR TESTING A COMMUNICATION LINK

(75) Inventors: Bjørn Dag Johnsen, Oslo (NO); Dag Moxnes, Oslo (NO); Line Holen, Fetsund (NO); Roy Arntsen, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 842 days.

This patent is subject to a terminal disclaimer.

(21) Appl. No.: 11/454,067

(22) Filed: Jun. 14, 2006

(51) Int. Cl.
*H04L 12/26* (2006.01)
(52) U.S. Cl. ...................... 370/248; 370/251
(58) Field of Classification Search .............. None
See application file for complete search history.

(56) References Cited

U.S. PATENT DOCUMENTS

| | | | | |
|---|---|---|---|---|
| 4,611,320 A | * | 9/1986 | Southard | 370/241 |
| 5,438,528 A | * | 8/1995 | Emerson et al. | 702/119 |
| 6,219,786 B1 | * | 4/2001 | Cunningham et al. | 713/152 |
| 6,470,385 B1 | * | 10/2002 | Nakashima et al. | 709/224 |
| 6,674,724 B1 | * | 1/2004 | Main et al. | 370/241 |
| 7,171,157 B2 | * | 1/2007 | Lee | 455/8 |
| 2004/0252646 A1 | * | 12/2004 | Adhikari et al. | 370/252 |
| 2005/0050189 A1 | * | 3/2005 | Yang | 709/223 |
| 2005/0265241 A1 | * | 12/2005 | Makowski et al. | 370/241 |
| 2006/0088035 A1 | * | 4/2006 | Beeson et al. | 370/395.52 |
| 2007/0041328 A1 | * | 2/2007 | Bell | 370/248 |
| 2009/0080337 A1 | * | 3/2009 | Burns et al. | 370/248 |

* cited by examiner

*Primary Examiner*—Seema S Rao
*Assistant Examiner*—Rhonda Murphy
(74) *Attorney, Agent, or Firm*—Park, Vaughan & Fleming LLP (57) ABSTRACT

Accordingly, one embodiment of the invention provides a method for testing a communications link. The method includes establishing a connection over the communications link and completing link training over the communications link. Additional testing is now performed over the communications link. Assuming successful completion of the additional testing, it is reported to a network manager that link training has completed. This then allows use of the link for network communications to commence.

18 Claims, 7 Drawing Sheets

METHOD AND APPARATUS FOR TESTING A COMMUNICATION LINK

FIELD OF THE INVENTION

The present invention relates to testing of a communications link in a network, especially when a connection is first established over the communications link.

BACKGROUND OF THE INVENTION

The InfiniBand (IB) Architecture defines a computer networking architecture that allows end nodes to communicate with one another via a fabric or subnetwork comprising one or more switches. A full definition of the IB Architecture may be found in the InfiniBand Architecture Specification Volumes 1 and 2, available from the InfiniBand Trade Association (www.infiniBandta.org), which is hereby incorporated by reference.

When a new connection is powered up in a communications network it is common to perform link training. Such link training may be used to set threshold levels in physical (hardware) devices, for example in relation to signal timing and amplitude. Although the IB specification includes such link training, it does not define any elaborate link testing or diagnostics operations. As a result, it is possible for a link to train satisfactorily, but still to have certain inherent problems. In addition, the IB specification does not require a subnet manager (SM) to support any additional link testing and diagnostics, beyond being able to read diagnostic status attributes, and being able to observe error counter attributes that may be updated during training and/or normal operation.

Consequently, the default approach for handling any additional desired testing is based on manual or bespoke coordination of instructions to the controlling logic on each side of a link. This coordination is performed via some out-of-band mechanism. Such an approach has been used, for example, with the link built-in self-test (LBIST) procedures for IB nodes from Sun Microsystems. However, this is only feasible where the subnet manager is compatible with the testing and coordination between the controlling logic on the two network nodes representing the ends of the link. Otherwise, the subnet manager may regard an attempt to perform elaborate link BIST operations as a case of link failure. As a result, nodes that implement such testing are restricted to use in conjunction with a subnet manager that also supports such testing, thereby limiting interoperability and flexibility for customers in configuring an IB network.

SUMMARY OF THE INVENTION

Accordingly, one embodiment of the invention provides a method for testing a communications link. The method includes establishing a connection over the communications link and completing link training over the communications link. The method further includes performing additional testing over the communications link, and, following successful completion of the additional testing, reporting to a network manager that the link training has completed (for example, by setting a port attribute that can be read by the network manager). Once this report has been made, the network manager can start use of the link for network communications (this may involve further testing of the link by the network manager itself).

In one embodiment, the communications link forms part of an InfiniBand (IB) network and the network manager comprises a subnet manager. However, the approach may be employed in any other suitable communications network. Note that the additional testing is not dependent upon any out-of-band coordination between nodes in the network. Rather, the additional testing generally uses only in-band communications, and can be initiated on an automated basis for all implementations.

Since the additional testing is performed prior to notifying the network manager that the link training has successfully completed, from the perspective of the network manager the additional training is part of the link training. Accordingly, the link is in effect shielded or hidden from the network manager during the additional testing. As a result, the network manager does not try to interpret any transmissions over the communications link during the additional testing, thereby avoiding the possibility of the network manager flagging an error if it does not understand the testing configuration. In addition, since the network manager does not allow normal network communications to commence over the link until the link training (including the additional testing) has completed, there is no risk of such normal network communications disrupting the additional testing.

In one embodiment, the additional testing includes sending subnet management packets (SMPs) over the communications link. Since SMPs are standard for an IB network, the node at the far end of the communications link should be able to accept and process the SMPs; if not, this is indicative of some error condition on the link (or at the remote node). The additional testing is controlled by using vendor attributes within the SMPs. It will be appreciated that only some nodes may recognise these vendor attributes; it is only these nodes that will be able to play an active role in the additional testing. However, even for nodes that do not recognise the vendor attributes, the IB specification still determines that such SMPs should be supported in a generic sense. In other words, a remote node would accept and recognise the incoming SMPs, but would be unable to interpret and then implement the specific testing instructions included in the SMPs. In such circumstances, the remote node would indicate that it does not support the vendor specific attributes, and the additional testing can then be terminated.

In one embodiment, the additional testing may include an LBIST procedure in which the link interfaces on one or both sides of the communications link are operated in a mode that allows special test patterns to be generated on the communications link. This mode may be maintained for a predefined or negotiated period of time.

In one embodiment, the additional testing may include loopback testing, for example from the transmitter of one port to the receiver of the same port, or from a first port on a switch to a second port on the same switch. Such loopback configurations might in normal circumstances confuse the network manager. However, by completing the testing prior to releasing the communications link to the network manager, the network manager is in effect shielded from these unusual configurations.

Another embodiment of the invention provides apparatus for use as a node in a communications network. The apparatus comprises an interface port for connection to a communications link and logic for performing link training and additional testing over the communications link. The logic is configured to report completion of the link training to allow network communications to commence over the link only after the additional testing has successfully completed.

Other embodiments of the invention provide a computer program and computer program product for implementing the various methods described above.

BRIEF DESCRIPTION OF THE DRAWINGS

Various embodiments of the invention will now be described in detail by way of example only with reference to the following drawings, in which like reference numerals pertain to like elements, and in which.

DETAILED DESCRIPTION

1) The InfiniBand Architecture

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
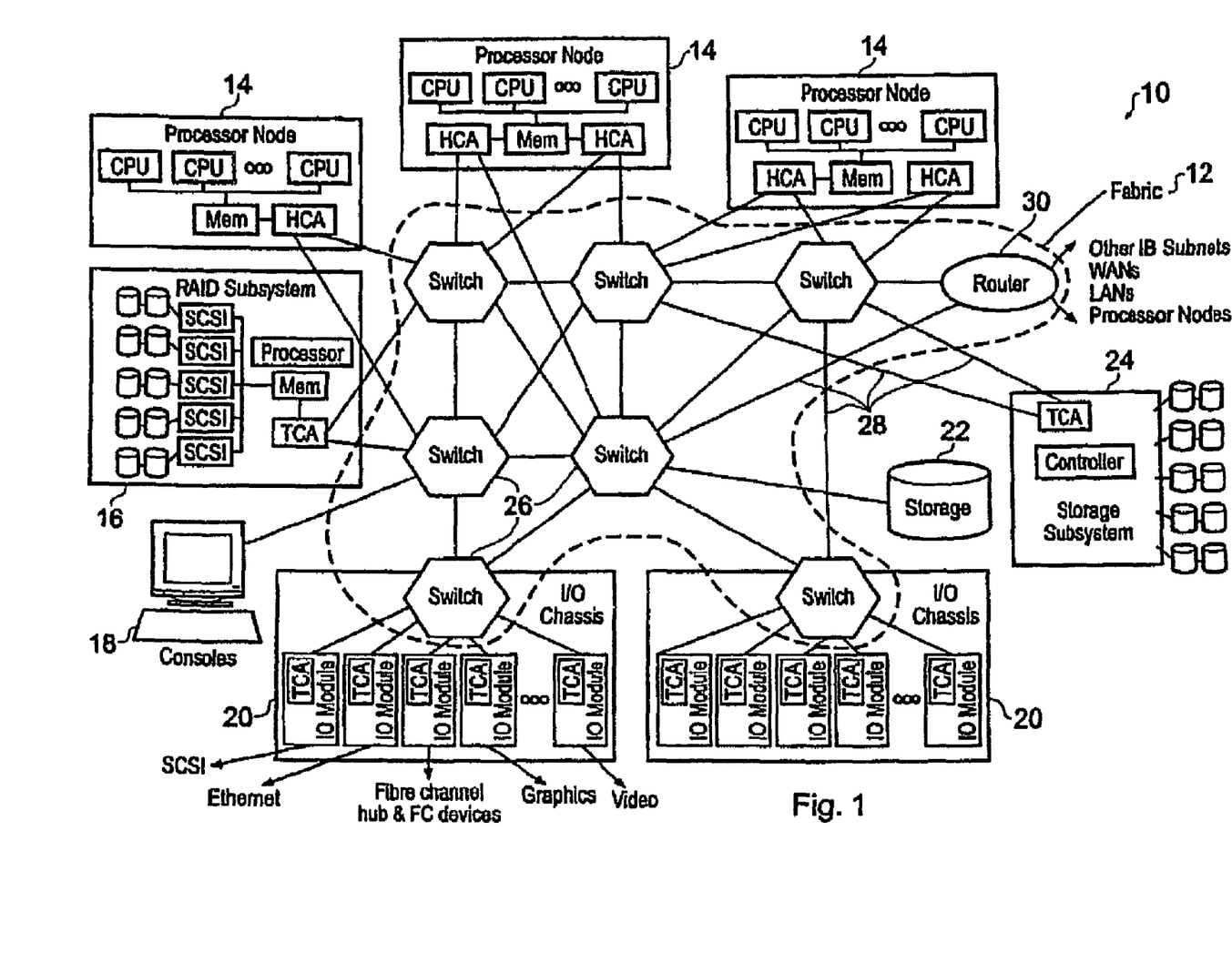
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBand Architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each endnode 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
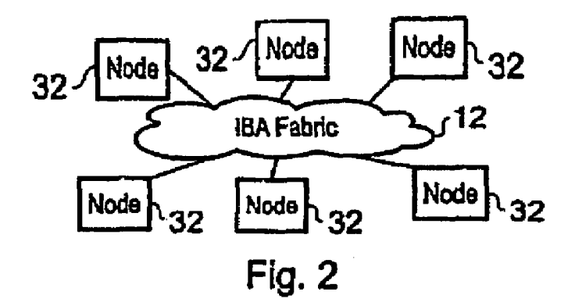
FIG. 2 is a schematic block diagram of a simplified arrangement of an InfiniBand Architecture system.
Figure 3:
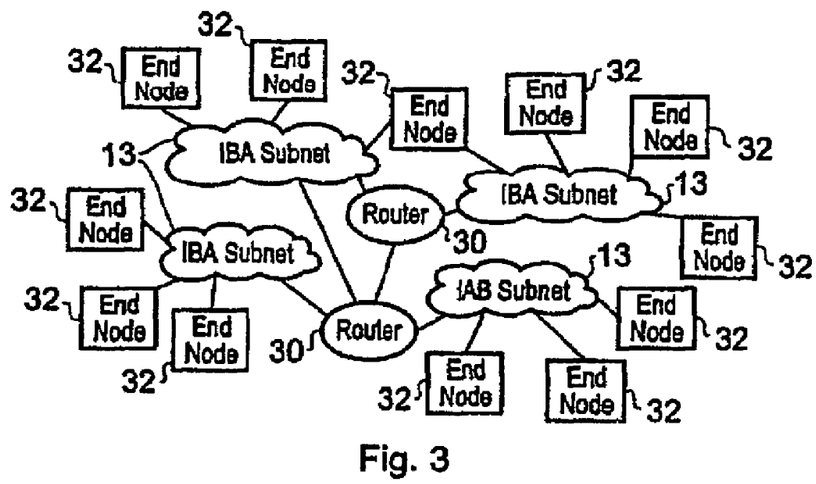
FIG. 3 is a schematic block diagram of another simplified arrangement of an InfiniBand Architecture system.
Figure 4:
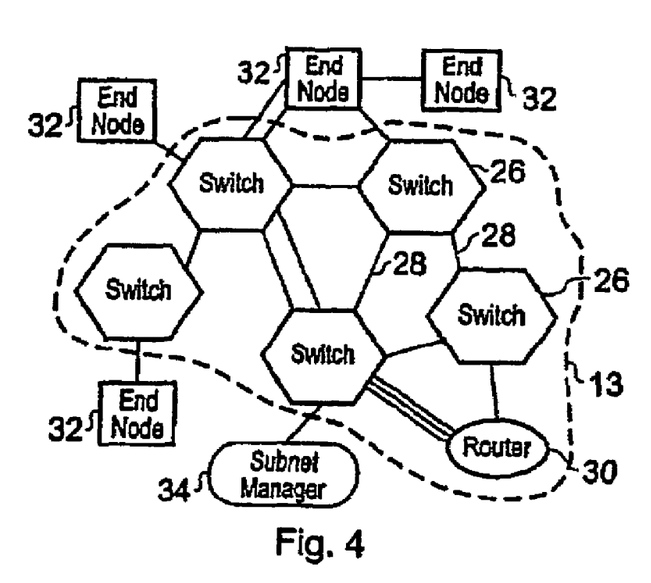
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
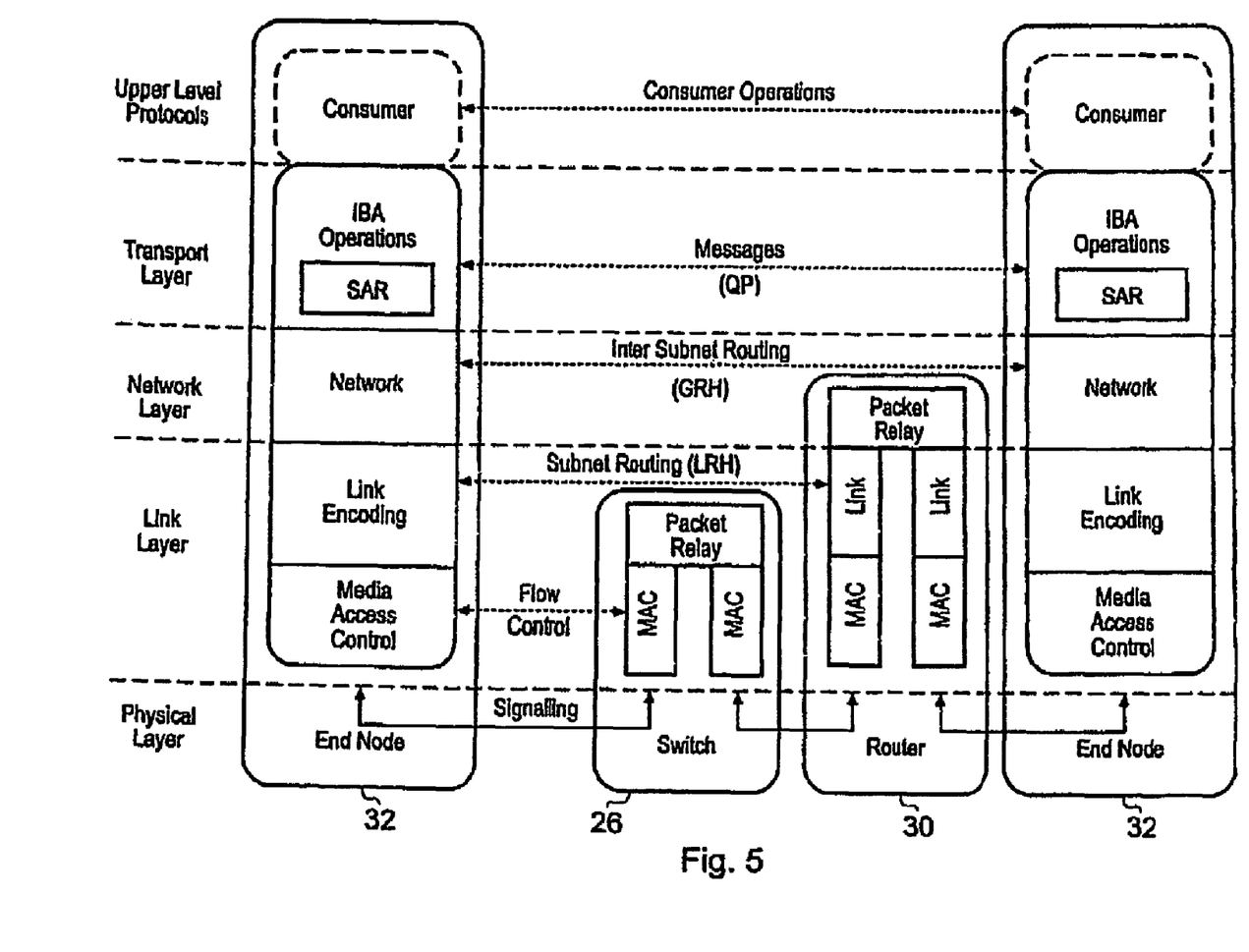
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

Figure 6:
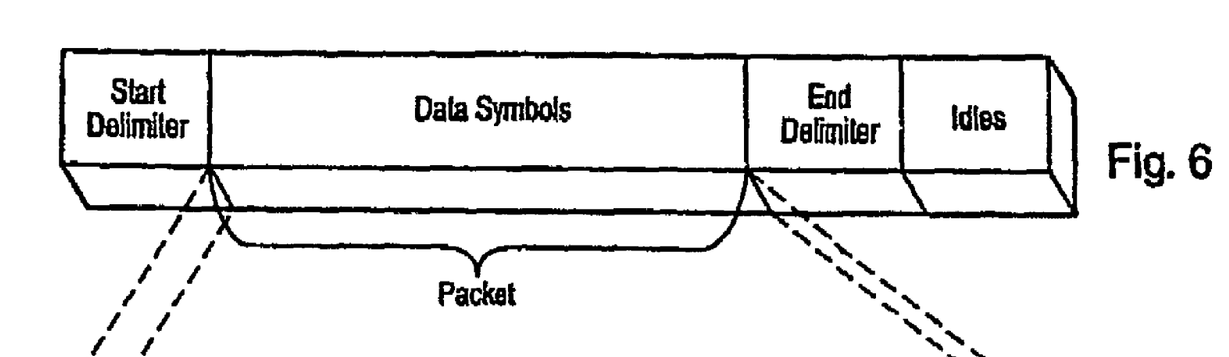
FIG. 6 shows schematically the structure of a message to be transmitted via an InfiniBand Architecture system.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
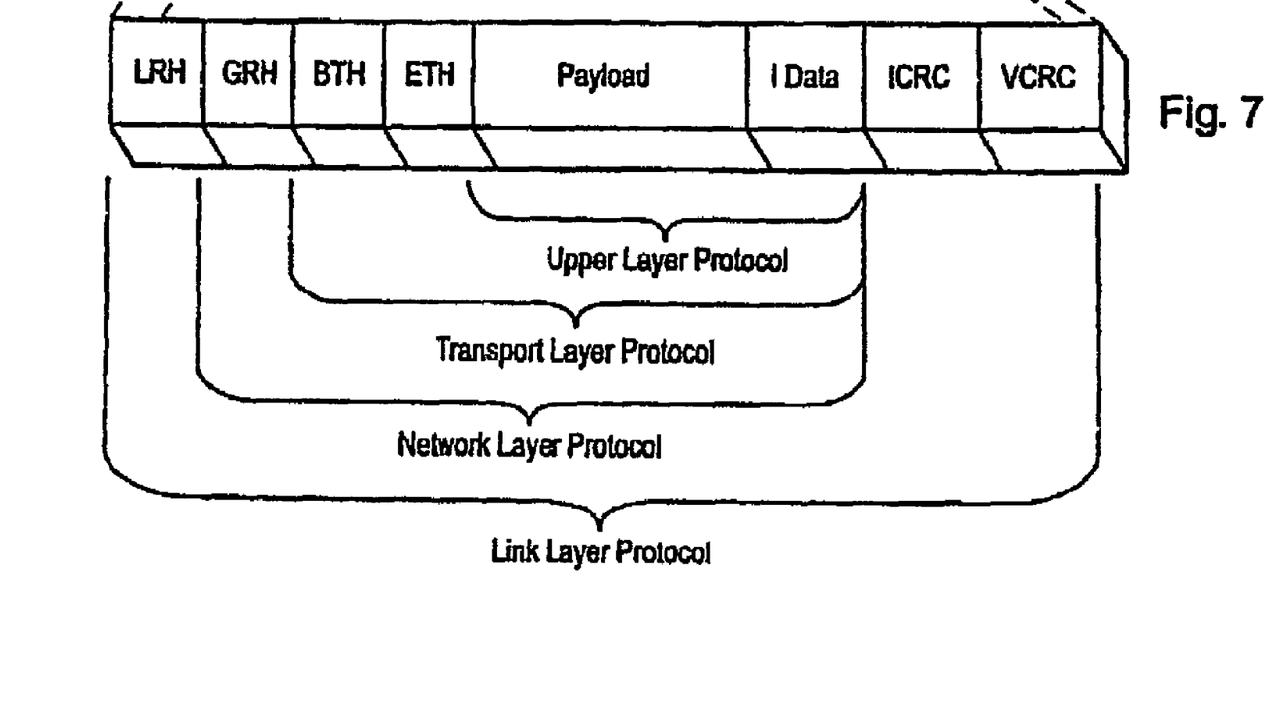
FIG. 7 shows schematically the format of a packet of the message of FIG. 6.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI, etc.) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width, etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header, but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write, etc.). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
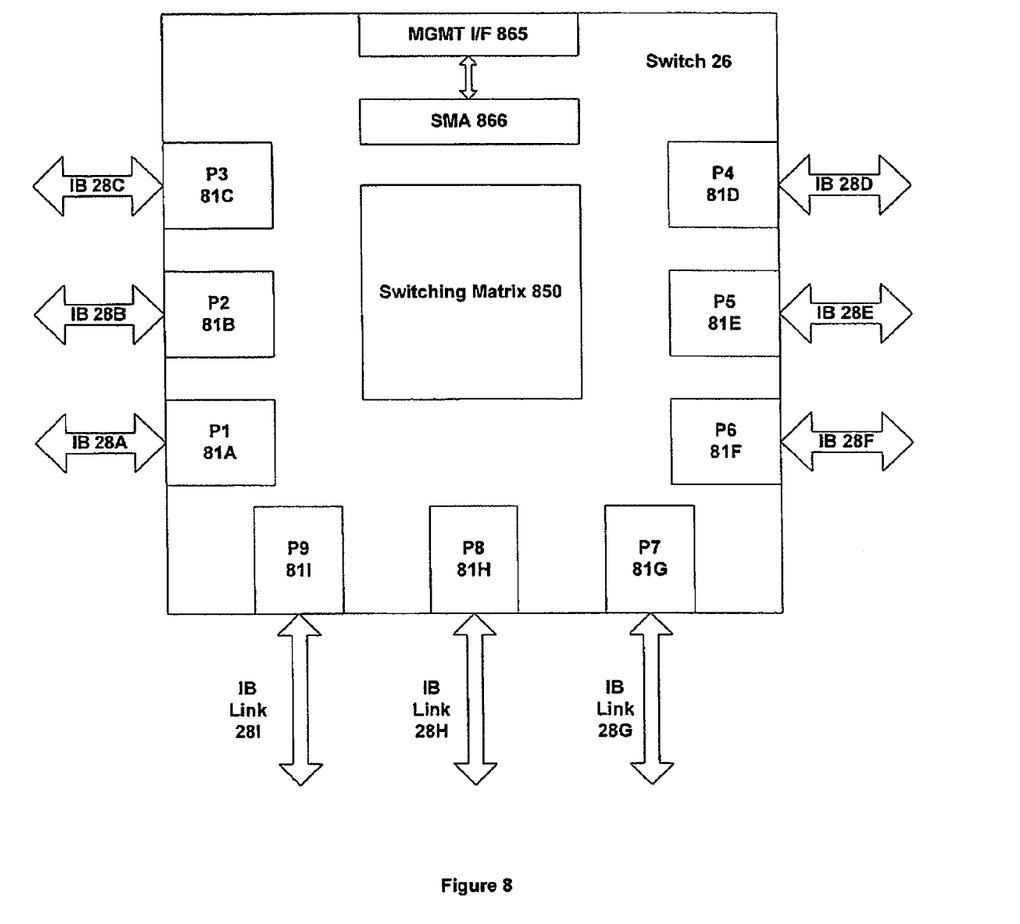
FIG. 8 is a schematic block diagram showing a switch for use in an InfiniBand network in accordance with one embodiment of the invention.

FIG. 8 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850. Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A).

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 8, switch 26 has nine ports 81, denoted in FIG. 8 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

2) Initialization Procedure

Figure 9:
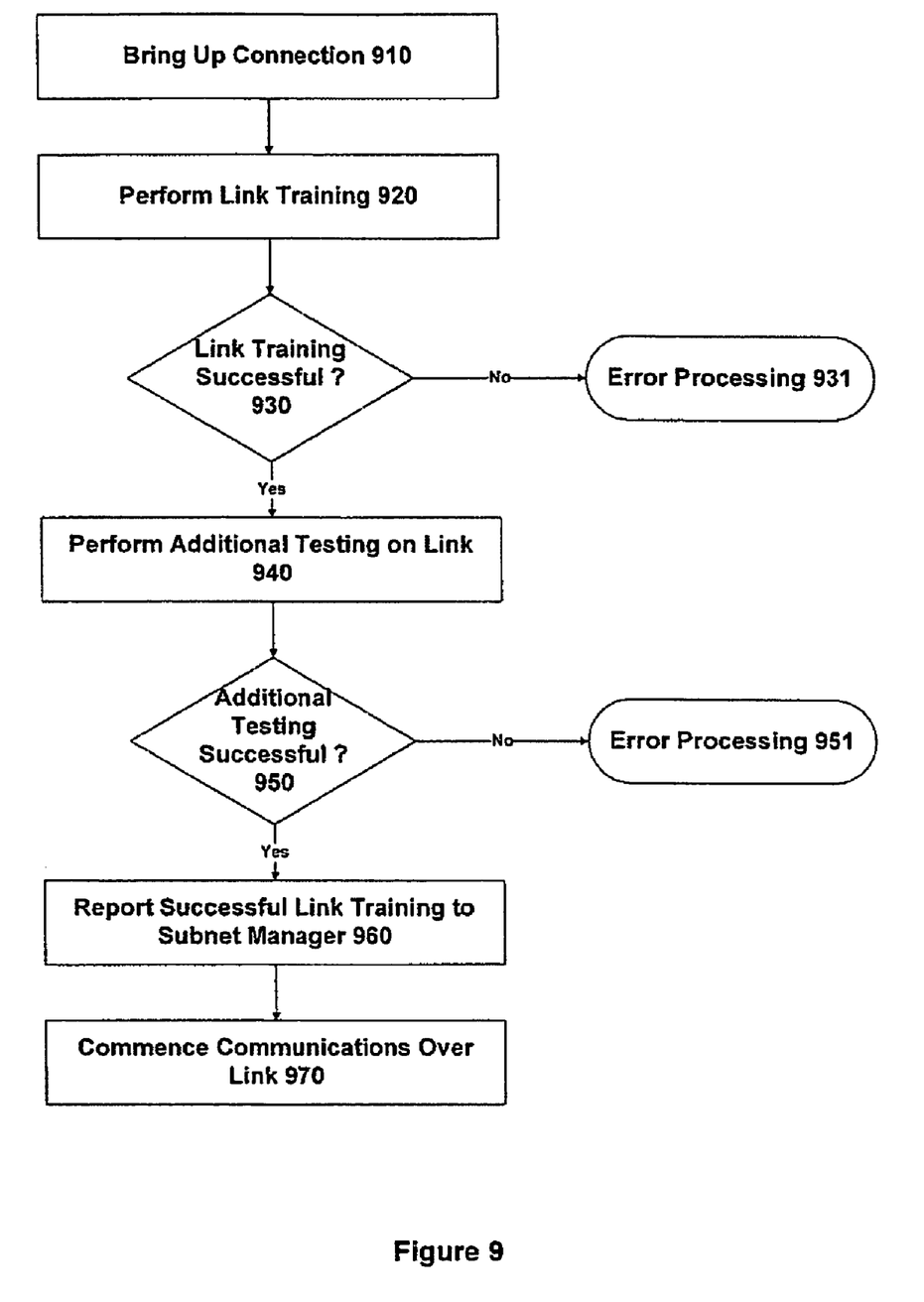
FIG. 9 is a high-level flowchart illustrating a method for testing a communications link in accordance with one embodiment of the invention.

FIG. 9 is a high-level flowchart that illustrates a procedure for initialising a communications link in accordance with one embodiment of the invention. This procedure may be implemented by a subnet manager agent on a communications node, or by any other suitable form of control logic.

The processing of FIG. 9 commences with establishing or bringing up a connection over the link (910). On some occasions, this may involve powering up a device that already has a physical connection to another device (that is already powered up). On other occasions, a connection may be established by plugging a cable into two nodes that are already on-line.

In response to establishing the new connection, the two nodes at either end of the link perform link training (920). A determination is now made as to whether or not the link training was successful (930), and if not some appropriate error processing is performed (931). Note that since link training is defined as part of the IB specification, it is expected that such link training will be supported by all nodes on the network. In addition, since link training 920 and error processing 931 are performed in existing networks, these operations are already familiar to the skilled person and so will not be described further.

In a conventional IB system once link training has successfully completed, this is reported to the subnet manager. However, in the procedure of FIG. 9, such reporting is delayed until after additional testing is performed (940). In particular, once a determination has been made that the additional testing was successful (950), the completion of link training is reported to the subnet manager (960). This then allows the subnet manager to start using the link for network communications (970), as per a conventional IB system (this may involve further link testing by the subnet manager itself). Alternatively, if the additional testing is unsuccessful, then appropriate error processing is performed (951), as described in more detail below.

Since the additional testing 940 is performed prior to notifying the subnet manager that link training has completed 960, from the perspective of the subnet manager the additional testing appears to be part of the link training. Since the subnet manager knows that the link is not available for use during link training, the subnet manager will not start normal network communications over the link during the additional testing. This then avoids any risk of the additional testing being impacted by network communications on behalf of the subnet manager (and vice versa). Furthermore, the delay in reporting completion of the link training to the subnet manager allows the additional testing to be shielded or hidden from the subnet manager. In particular, the additional testing (940) may involve configurations that might otherwise confuse the subnet manager or cause it to flag an error if normal network communications were in progress. However, during link training (including anything that the subnet manager regards as link training), the subnet manager in effect ignores these configurations.

Note that the procedure of FIG. 9 does not require any special processing on behalf of the subnet manager. Rather, the subnet manager merely commences communications over the link 970 once it has received confirmation of successful link training 960. Since this represents conventional subnet manager behaviour in accordance with the IB specification, this allows the procedure of FIG. 9 to be adopted in a network with any subnet manager implementation that complies with the IB specification (or with an analogous standard for any other form of network). This is to be contrasted with existing arrangements for additional testing, which generally require specific support from and coordination with the subnet manager (and so are limited to those configurations with suitable subnet manager implementations).

The processing of FIG. 9 exploits the fact that a subnet manager is logically separated from the node implementation. As a result, the subnet manager can only observe link states (port states) by reading port attributes using subnet management packets (SMPs). These SMPs are sent through the abstract subnet management interface (SMI) 865 of the port with which the subnet manager is associated (i.e. the special management port in the case of a switch, sometimes referred to as Port 0). As a result, the logic controlling the low-level attributes and link state of a node is able to virtualize the link state that the subnet management agent (SMA) makes available to the subnet manager. This prevents the subnet manager from directly observing the state transitions defined in the IB specification for bringing up and training a physical link. Thus although link training completes after operation 920, the subnet manager only becomes aware of this fact when the SMA (or other controlling logic) chooses to report to the subnet manager the relevant state transition (such as from "link-down"→"link-initialize"). The procedure of FIG. 9 uses this virtualization capability to perform the additional testing of operation 940 prior to making the port and link available for use by a subnet manager operating from the local side of the port.

Figure 10:
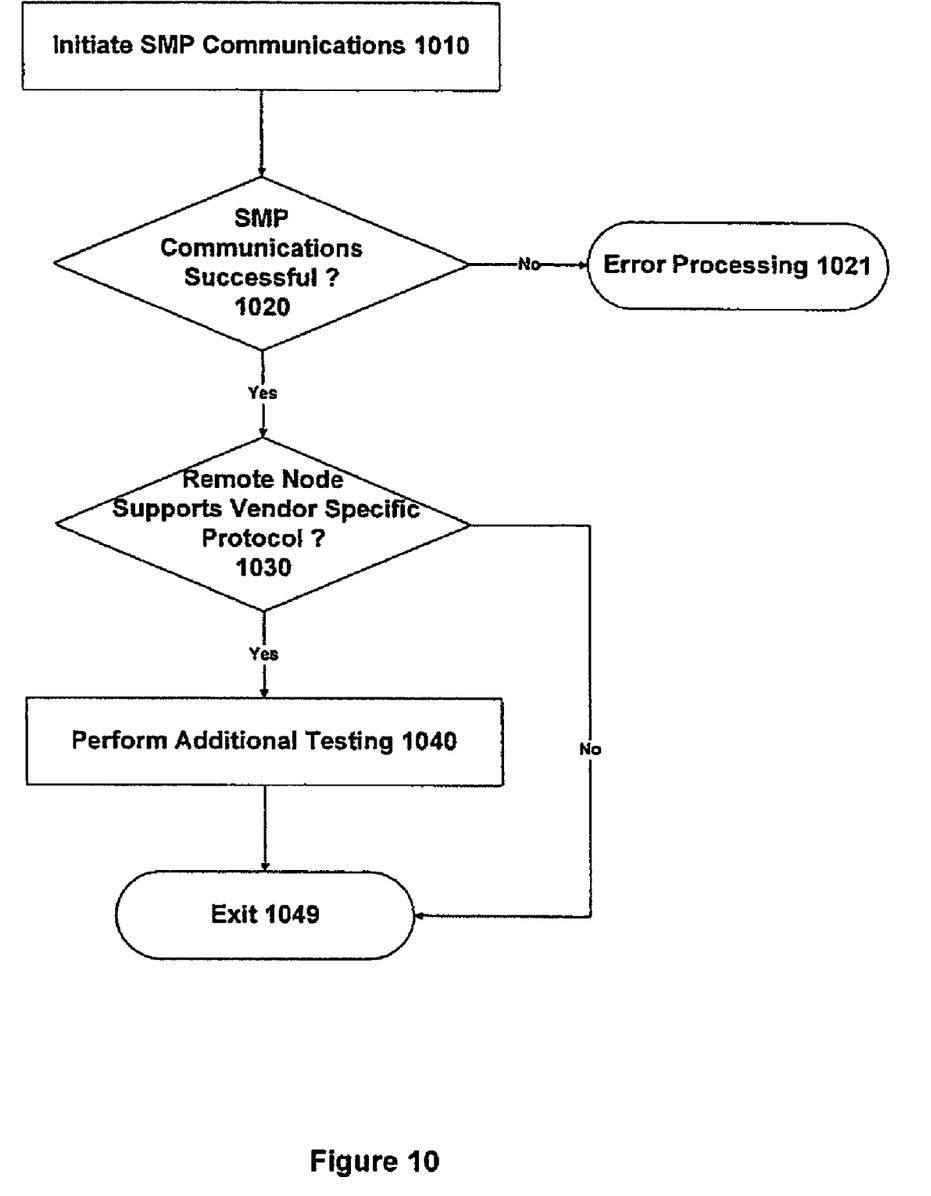
FIG. 10 is a flowchart illustrating in more detail part of the method of FIG. 9 for testing a communication link.

FIG. 10 is a flowchart that illustrates in more detail the additional testing 940 of FIG. 9 in accordance with one embodiment of the invention. The method commences with initiating SMP communications from a local node at one end of the link to a remote node at the other end of the link (1010). In particular, the control logic (e.g. the SMA) at the local node transmits direct-routed SMPs to the port directly attached to the other side of the local link.

Various methods can be used to determine which of the two nodes at the end of a link initiates the additional testing. For example, the default might be for the node with the lowest unique ID to initiate the testing. This may be subject to some form of time-out, so that if the node with the lower ID does not initiate testing within a certain time period, such action then becomes the responsibility of the node with the higher ID (this then covers the possibility that the node with the lower ID does not support the additional testing of FIG. 10). Another possibility is that both nodes attached to the link try to initiate the additional testing, independently of the other node.

Once the SMP(s) have been transmitted, the local node waits to receive a response to the SMP communication (1020). It is noted that since any IB node is required to respond to such an SMP communication, a lack of a response indicates a problem with the link (or remote node) that for some reason has not been detected during link training. Consequently if no response is received, despite a reasonable number of time-outs and retries, error processing is performed (1021). This error processing may involve reading local error counters, for example to see if the communications are subject to CRC errors. If so, the link may be reported as suspect, with further diagnostic actions required. On the other hand, if the local error counters do not reveal any problem, one option might be to terminate the additional testing, and to proceed directly to operation 960 in FIG. 9. In other words, the conclusion of link training is reported to the subnet manager, and network communications start over the link. This approach in effect hands over responsibility for dealing with any problems on the link to the subnet manager, and might be appropriate for example if the remote node lacked proper support for the original SMP communications, but was otherwise functional for network communications. Alternatively, even if the local error counters do not reveal any problem, the link might still be reported as suspect (given the failed SMP communications) in order to initiate further diagnosis.

The SMP communication initiated in operation 1010 conforms to a special vendor protocol, in particular one based on "SMP vendor attributes" as defined in the IB specification. This facility allows the exchange of proprietary information between cooperating entities that are aware of the specific protocol identified by the vendor specific information. The IB specification requires all nodes to accept and recognise such SMPs as relating to a special vendor protocol, but clearly only those nodes that are specifically designed to support the special vendor protocol can understand the details of the SMP. Thus if the remote port/node is aware of the special vendor protocol identified in the received vendor SMPs, the remote node responds with a well-defined acknowledgement; if not, a well-defined error response is generated according to the IB specification.

Accordingly, when the local node receives a response from the remote node to the SMP communications there are two potential situations, as determined by operation 1030. In the first situation, the remote node responds indicating that it does indeed support the vendor specific protocol. As a result, the local and remote nodes can use the vendor specific protocol to perform additional testing of the communication link (1040). In particular, the local node can exchange more information with the remote node about observed link state, and also perform various additional link tests.

Alternatively, the remote note may respond with an error message indicating that it has received the incoming SMP message(s), but does not recognise the vendor specific protocol. In this situation, the remote node is not able to perform additional testing of the link, since it cannot follow the instructions in the SMP. In effect therefore the remote node provides a negative response to the local node. As a result, the procedure exits directly (1049), without any further testing, thereby transferring responsibility to the subnet manager to complete the link bring-up sequence. Nevertheless, the local node has already confirmed that the remote node can receive, process (in a generic fashion) and provide an appropriate response to SMPs transmitted over the link.

Note that the local node may also be able to determine whether or not the remote node supports additional testing based on other communications from the remote node (rather than a response to the SMPs sent by the local node at operation 1010). For example, the local node may determine that the remote node supports additional testing if the local node receives a corresponding vendor type request from the remote node (i.e. where the remote node itself is trying to initiate additional testing). Alternatively, the local node may determine that the remote node does not support additional testing if it receives a request from the remote node that is not expected to be part of any initial hand-shaking among nodes or ports that support the extended link bring-up scheme shown in FIG. 9.

The additional testing performed on the link at operation 1040 may comprise an LBIST procedure or similar. Such testing may be based on special test patterns such as a hardware-defined sequence that may not conform to a standard packet structure. To avoid the use of an out-of-band facility to coordinate such testing, the testing can be performed for a predetermined period (e.g. of time, number of bits, etc.). The predetermined period may be predefined, for example as part of the special vendor protocol, or alternatively the special vendor protocol may include a facility for the predetermined period to be negotiated between nodes.

One particular advantage of the additional testing of FIG. 10 is that since the subnet manager is not involved, it is possible to test various specific configurations such as loopbacks that are relevant for diagnostic purposes but not for normal run-time operations. One example of such loopback connectivity is among ports on the same channel adapter (this particular configuration may in fact make sense at run-time, for example to allow the hardware to operate more efficiently than by use of internal loopback/bypass logic). Another potential loopback configuration is to provide connectivity between two ports on the same switch. Such a configuration has no run-time value, and may in addition confuse the routing logic within a subnet manager. A further form of loopback connectivity may be provided between the transmitter and receiver of a single physical port. Since this configuration is outside the IB specification, it would almost certainly cause problems for a subnet manager. Nevertheless, such a configuration can be included within the additional testing of FIG. 10, since it is shielded from the subnet manager, which does not become involved until after the link training is reported as having completed.

Note that the loopback configuration may be implemented both by some special (external) connector or cable, or may represent a feature of the relevant port or associated link interface logic, such as a fibre-optical convertor. In the latter configuration, the negotiated test cases may include testing in loopback mode where test communications are sent out from the local IB port and then looped back at the local link interface. Alternatively, the loopback may be effected within the link interface logic of the remote end. Note that the vendor SMP protocol may include negotiation of when and how long the various loopback modes should be enabled (as for the LBIST testing mentioned above). After the loopback phase, the link may be allowed to re-train in the normal end-to-end fashion, and further vendor SMP communication may occur as appropriate (possibly including the reporting of locally observed test status to the remote side).

The approach set out in FIGS. 9 and 10 can also be used for more prolonged testing of a connection—for example, where the purpose of the testing is primarily aimed at investigating system behaviour, rather than as a precursor to normal network operations. Thus assuming that the control logic behind all ports on the same node is inherently coordinated and able to exchange information without depending on any external communication (in-band or out-of-band), the testing of FIGS. 9 and 10 can be employed if either the same or another local port is observed on the other side of the link. In this case, the additional testing could be performed indefinitely to run various diagnostic analyses.

The above approach therefore allows both hardware and software testing by manipulating the semantics of standard Infiniband link states in a way that is fully compatible with the IB specification. This allows an Infiniband link to be tested without depending on special support from or coordination with a (generic) Infiniband subnet manager and without depending on out-of-band coordination. The approach permits more extensive testing of relevant links at system deployment time as well as during re-configuration or following link failures. At the same time, the subnet manager is prevented from observing state changes during the testing that it might otherwise interpret as cases of unexpected link error/failure. By utilizing automatic handling and in-band synchronization, the testing is very user friendly, and does not require any management input for normal operations.

The approach described herein is mutually compatible with the security schemes set out in the earlier applications: "Method and Apparatus for Authenticating Nodes in a Communications Network", U.S. patent application Ser. No. 10/859,251, filed 2 Jun. 2004, and "Securing Management Operations in a Communications Fabric", U.S. patent application Ser. No. 10/803,497, filed 18 Mar. 2004, both assigned to the same assignee as the present invention (both of these applications are hereby incorporated by reference into the present application). In particular, the use of vendor SMPs for testing the link in the procedure of FIG. 10 can be viewed as neutral from a security perspective. This is because the vendor SMPs are not used to impose any significant state change for the other end of the link. In addition, the vendor SMPs do not represent any ability to transfer information between the two end-points of the link if the data set(s) transmitted or exchanged for the additional testing are predefined or generated based on some neutral basis. Accordingly, the additional testing may be performed on a link to a node or port that has not yet been authenticated as per the above-mentioned patent applications without compromising node security.

The software components described herein may comprise program instructions and/or data instructions on some fixed, non-volatile storage (computer program product), such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. A method for testing an InfiniBand communications link comprising:
  establishing a connection over the InfiniBand communications link;
  completing link training over the InfiniBand communications link;
  in response to the link training being successful, delaying reporting completion of link training to a subnet manager, thereby preventing the subnet manager from starting normal network communications over the InfiniBand communications link;
  performing additional testing over the InfiniBand communications link after successful link training by transmitting subnet management packets over the InfiniBand communications link; and
  following successful completion of the additional testing, reporting to the subnet manager that link training has completed, thereby allowing the subnet manager to start use of the InfiniBand communication link for network communications.

2. The method of claim 1, wherein said additional testing includes sending one or more subnet management packets (SMPs) over the communications link.

3. The method of claim 2, further comprising determining an error condition that prevents successful completion of the additional testing if no response is received to the SMPs.

4. The method of claim 2, wherein said SMPs use vendor attributes to control said additional testing.

5. The method of claim 4, further comprising terminating the additional testing if a node at one end of the communications link is unable to process the vendor attributes.

6. The method of claim 1, wherein said additional testing includes transmitting special test patterns onto the communications link for a predetermined period.

7. The method of claim 1, wherein said additional testing includes loopback testing.

8. The method of claim 1, wherein said reporting to a network manager that link training has completed comprises setting a port attribute that can be read by the network manager.

9. A computer program product comprising a storage medium program instructions on a medium, wherein said instructions are executable by a machine to perform a method for testing an InfiniBand communications link, the method comprising:
  establishing a connection over the InfiniBand communications link;
  completing link training over the InfiniBand communications link;
  in response to the link training being successful, delaying reporting completion of link training to a subnet manager, thereby preventing the subnet manager from starting normal network communications over the InfiniBand communications link;

performing additional testing over the InfiniBand communications link after successful link training by transmitting subnet management packets over the InfiniBand communications link; and following successful completion of the additional testing, reporting to the subnet manager that link training has completed, thereby allowing the subnet manager to start use of the InfiniBand communications link for network communications.

10. Apparatus for use as a node in an InfiniBand communications network, said apparatus comprising:

an interface port for connection to an InfiniBand communications link;

logic for performing link training over the InfiniBand communications link, wherein said first logic is configured to delay report completion of the link training to a subnet manager to prevent the subnet manager from staring normal network communications over the InfiniBand communications link, wherein said logic is configured to perform additional testing by transmitting subnet management packets over the InfiniBand communications link after successful link training, wherein said logic is further configured to report to the subnet manager the completion of link training, thereby allowing network communications to commence over the InfiniBand communications link.

11. The apparatus of claim 10, wherein said additional testing includes transmission of one or more subnet management packets (SMPs) over the communications link.

12. The apparatus of claim 11, wherein said logic is configured to determine an error condition that prevents successful completion of the additional testing if no response is received to the SMPs.

13. The apparatus of claim 11, wherein said SMPs include vendor attributes to control said additional testing.

14. The apparatus of claim 13, wherein said logic is further configured to terminate the additional testing if a remote node at an opposite end of the communications link is unable to process the vendor attributes.

15. The apparatus of claim 10, wherein said additional testing includes transmitting special test patterns onto the communications link for a predetermined period.

16. The apparatus of claim 10, wherein said additional testing includes loopback testing.

17. The apparatus of claim 10, wherein said interface port includes a status attribute that can be read by a network manager to confirm completion of the link training.

18. The apparatus of claim 10, wherein said logic comprises a subnet management agent.

* * * * *